US011954528B2

(12) United States Patent
Guim Bernat et al.

(10) Patent No.: US 11,954,528 B2
(45) Date of Patent: Apr. 9, 2024

(54) TECHNOLOGIES FOR DYNAMICALLY SHARING REMOTE RESOURCES ACROSS REMOTE COMPUTING NODES

(71) Applicant: Intel Corporation, Santa Clara, CA (US)

(72) Inventors: Francesc Guim Bernat, Barcelona (ES); Kshitij A. Doshi, Tempe, AZ (US); Daniel Rivas Barragan, Cologne (DE); Alejandro Duran Gonzalez, Esplugues de Llobregat (ES); Harald Servat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/978,788

(22) Filed: Nov. 1, 2022

(65) Prior Publication Data

US 2023/0047886 A1 Feb. 16, 2023

Related U.S. Application Data

(63) Continuation of application No. 17/549,110, filed on Dec. 13, 2021, now Pat. No. 11,822,963, which is a
(Continued)

(51) Int. Cl.
*H04L 67/51* (2022.01)
*G06F 9/50* (2006.01)
(Continued)

(52) U.S. Cl.
CPC .......... *G06F 9/5005* (2013.01); *G06F 9/5016* (2013.01); *G06F 9/5022* (2013.01);
(Continued)

(58) Field of Classification Search
None
See application file for complete search history.

(56) References Cited

U.S. PATENT DOCUMENTS

| 2014/0359044 | A1* | 12/2014 | Davis | H04L 49/25 709/213 |
| 2017/0244387 | A1 | 8/2017 | Matsuda et al. | |
| 2017/0344387 | A1* | 11/2017 | Fawcett | G06F 13/4068 |

OTHER PUBLICATIONS

Final Office Action from U.S. Appl. No. 17/549,110 dated Apr. 20, 2023, 12 pgs.
(Continued)

*Primary Examiner* — Cai Y Chen
(74) *Attorney, Agent, or Firm* — Essential Patents Group, LLP; Christopher K. Gagne

(57) ABSTRACT

Technologies for dynamically sharing remote resources include a computing node that sends a resource request for remote resources to a remote computing node in response to a determination that additional resources are required by the computing node. The computing node configures a mapping of a local address space of the computing node to the remote resources of the remote computing node in response to sending the resource request. In response to generating an access to the local address, the computing node identifies the remote computing node based on the local address with the mapping of the local address space to the remote resources of the remote computing node and performs a resource access operation with the remote computing node over a network fabric. The remote computing node may be identified with system address decoders of a caching agent and a host fabric interface. Other embodiments are described and claimed.

21 Claims, 7 Drawing Sheets

Related U.S. Application Data continuation of application No. 15/636,969, filed on Jun. 29, 2017, now Pat. No. 11,216,306.

(51) Int. Cl.
| | |
|---|---|
| *H04L 67/1097* | (2022.01) |
| *H04W 8/22* | (2009.01) |
| *H04L 45/745* | (2022.01) |
| *H04L 61/103* | (2022.01) |
| *H04L 67/1004* | (2022.01) |
| *H04L 67/566* | (2022.01) |

(52) U.S. Cl.
CPC .......... *H04L 67/1097* (2013.01); *H04L 67/51* (2022.05); *H04W 8/22* (2013.01); *G06F 2209/463* (2013.01); *H04L 45/745* (2013.01); *H04L 61/103* (2013.01); *H04L 67/1004* (2013.01); *H04L 67/566* (2022.05)

(56) References Cited

OTHER PUBLICATIONS

Office Action for U.S. Appl. No. 17/549,110, dated Dec. 15, 2022.
Notice of Allowance from U.S. Appl. No. 17/549,110 dated Jul. 27, 2023, 8 pgs.
Final Office Action for U.S. Appl. No. 15/636,969, dated Jan. 21, 2021.
Notice of Allowance for U.S. Appl. No. 15/636,969, dated Aug. 30, 2021.
Office Action for U.S. Appl. No. 15/636,969, dated Aug. 31, 2020.

\* cited by examiner

TECHNOLOGIES FOR DYNAMICALLY SHARING REMOTE RESOURCES ACROSS REMOTE COMPUTING NODES

CROSS-REFERENCE TO RELATED APPLICATIONS

This application is a continuation of prior co-pending U.S. patent application Ser. No. 17/549,110, filed 13 Dec. 2021, which is a continuation of prior U.S. patent application Ser. No. 15/636,969, filed 29 Jun. 2017, now U.S. Pat. No. 11,216,306. Each of the aforesaid prior applications is hereby incorporated herein by reference in its entirety.

BACKGROUND

An increasingly wide variety of memory and storage resources is becoming available in modern computing platforms. For example, data centers with multiple computing nodes are fielding many applications with diverse resource needs. In many cases, different computing nodes may require different varieties and quantities of memory, storage, or other resources. As such, data center architectures have been developed to share available resources across machine boundaries.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
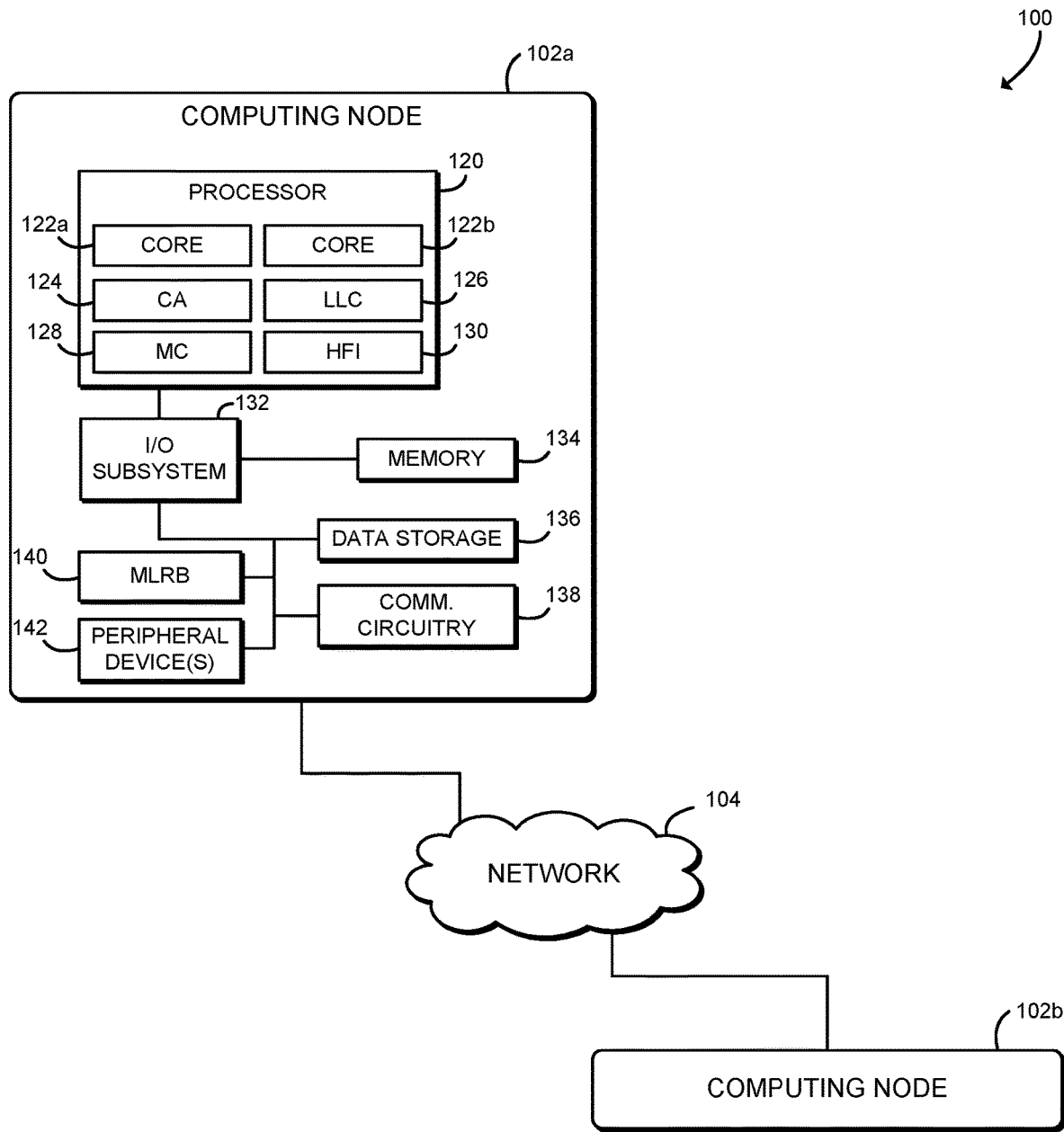
FIG. 1 is a simplified block diagram of at least one embodiment of a system for dynamically sharing remote resources across remote computing nodes.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for dynamic cooperative sharing of remote resources includes several computing nodes 102 in communication over a network 104. The illustrated system 100 includes two computing nodes 102a, 102b; however, it should be understood that the system 100 may include many more computing nodes 102. In use, as described in more detail below, a borrower computing node 102a configures a local address space to access available resources of a lender computing node 102b. To do so, the lender computing node 102b advertises a resource availability to remote computing nodes 102 over the network 104. It should be appreciated that the available resource may be a memory resource and/or a storage resource. In response to the resource advertisement, the borrower computing node 102a maps the local address space to the advertised resource of the lender computing node 102b and sends a request to the lender computing node 102b to access the advertised resource of the lender computing node 102b. Subsequently, the lender computing node 102b may reclaim the resource borrowed by the borrower computing node 102a, as described in detail below. The computing nodes 102a, 102b may perform these communication operations with a combination of software and hardware, for example using a host fabric interface, network interface controller, or other networking hardware of the computing nodes 102a, 102b. Thus, the system 100 allows memory, storage, or other resources to be shared beyond the chassis boundaries of the individual computing nodes 102. Accordingly, the system 100 may improve system flexibility as well as overall resource utilization and/or performance of the computing nodes 102 in the system 100.

Referring again to FIG. 1, each computing node 102 may be embodied as any type of computation or computer device capable of performing the functions described herein, including, without limitation, a computer, a server, a rack-mounted server, a high-performance computing node, a desktop computer, a workstation, a laptop computer, a notebook computer, a tablet computer, a mobile computing device, a wearable computing device, a network appliance, a distributed computing system, a processor-based system, and/or a consumer electronic device. As shown in FIG. 1, the computing node 102 illustratively includes a processor 120, an input/output ("I/O") subsystem 132, a memory 134, a data storage device 136, communication circuitry 138, and one or more peripheral devices 142. In some embodiments, the computing node 102 may also include a machine learning resource borrower (MLRB) 140. It should be appreciated that the computing node 102 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 134, or portions thereof, may be incorporated in the processor 120 in some embodiments.

The processor 120 may be embodied as any type of processor capable of performing the functions described herein. As shown in FIG. 1, the processor 120 is illustratively embodied as dual-core processor 120, having two processor cores 122, each of which is an independent processing unit capable of executing programmed instructions. However, in some embodiments, the processor 120 may be embodied as a single or multi-core processor(s), digital signal processor, microcontroller, or other processor or processing/controlling circuit. The illustrative processor 120 further includes a caching agent 124, a last-level cache 126, a memory controller 128, and a host fabric interface 130.

The last-level cache 126 is a data cache shared by the processor cores 122. For example, the last-level cache 126 may be embodied as a level 3 cache or other on-die memory cache. The caching agent 124 is a coherency agent within the computing node 102 that process memory requests from the cores 122a, 122b within the same computing node. In the illustrative embodiments, the caching agent 124 includes a system address decoder, which is configured to include a mapping of local address space to local resources of the computing node 102 and/or to remote resource(s) of one or more remote computing nodes 102. As described further below, when the computing node 102 determines that additional resources are required, the computing node 102 can access available remote resource of a remote computing node based on the mapping.

The memory controller 128 may be embodied as any type of controller or other circuitry capable of performing the functions described herein. The memory controller 128 may be configured to carry out conventional memory control operations, as well as memory control operations in accordance with embodiments described herein. For example, the memory controller 128 may be configured to service memory requests in local address spaces of the computing node 102 that are backed by the memory 134 of the computing node 102. It should be appreciated that the memory controller 128 may be implemented in a standalone configuration or as a CPU-integrated memory controller.

The host fabric interface 130 may be embodied as any communication interface, such as a network interface controller, communication circuit, device, or collection thereof, capable of enabling communications between the processor 120 and other remote computing nodes 102 and/or other remote devices over the network 104. The host fabric interface 130 may be configured to use any one or more communication technology and associated protocols (e.g., Ethernet, InfiniBand®, Intel® Omni-Path Architecture, etc.) to effect such communication. As described further below, the host fabric interface 130 may also include a system address decoder, which is configured to include a mapping of local address space remote resource(s) of one or more remote computing nodes 102. Although illustrated as including a single processor 120, it should be understood that each computing node 102 may include multiple processors 120, and each processor 120 may include an integrated host fabric interface 130. Additionally or alternatively, in some embodiments the host fabric interface 130 may be included as a separate component and/or integrated in another component of the computing node 102, such as the I/O subsystem 132 or the communication circuitry 138.

The memory 134 may be embodied as any type of volatile or non-volatile memory or data storage capable of performing the functions described herein. In some embodiments, the memory 134 may include two or more different types of memory having different performance or storage characteristics, such as dynamic RAM, nonvolatile RAM, on-package memory, etc. In operation, the memory 134 may store various data and software used during operation of the computing node 102 such as operating systems, applications, programs, libraries, and drivers. The memory 134 is communicatively coupled to the processor 120 via the I/O subsystem 132, which may be embodied as circuitry and/or components to facilitate input/output operations with the processor 120, the memory 134, and other components of the computing node 102. For example, the I/O subsystem 132 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 132 may form a portion of a system-on-a-chip (SoC) and be incorporated, along with the processor 120, the memory 134, and other components of the computing node 102, on a single integrated circuit chip.

The data storage device 136 may be embodied as any type of device or devices configured for short-term or long-term storage of data such as, for example, memory devices and circuits, memory cards, hard disk drives, solid-state drives, 3D XPoint storage, or other data storage devices. The communication circuitry 138 of the computing node 102 may be embodied as any communication circuit, device, or collection thereof, capable of enabling communications between the computing node 102 and one or more remote computing nodes 102 and/or other remote devices over the network 104. The communication circuitry 138 may be configured to use any one or more communication technology (e.g., wired or wireless communications) and associated protocols (e.g., Ethernet, InfiniBand®, Intel® Omni-Path Architecture, Bluetooth®, Wi-Fi®, WiMAX, etc.) to effect such communication.

In some embodiments, the computing node 102 may include the machine learning resource borrower (MLRB) 140. The machine learning resource borrower 140 may be embodied as any integrated circuit, functional block, accelerator, or other circuit that may be used by the computing node 102 to perform a machine learning algorithm. In particular, the machine learning resource borrower 140 may include or otherwise be embodied as a convolutional neural network, recurrent neural network, or other multilayered artificial neural network and/or related training algorithm used to determine whether additional resources are required by the computing node 102 and/or available for lending to remote computing nodes 102.

The computing device 100 may further include one or more peripheral devices 142. The peripheral devices 142 may include any number of additional input/output devices, interface devices, accelerator devices, and/or other peripheral devices. For example, in some embodiments, the peripheral devices 142 may include a touch screen, graphics circuitry, a graphical processing unit (GPU) and/or processor graphics, a field-programmable gate array (FPGA) device, an audio device, a microphone, a camera, a keyboard, a mouse, a network interface, and/or other input/output devices, interface devices, and/or peripheral devices.

As discussed in more detail below, the computing nodes 102 may be configured to transmit and receive data with each other and/or other devices of the system 100 over the network 104. The network 104 may be embodied as any number of various wired and/or wireless networks. For example, the network 104 may be embodied as, or otherwise include, a wired or wireless local area network (LAN), a wired or wireless wide area network (WAN), a cellular network, and/or a publicly-accessible, global network such as the Internet. As such, the network 104 may include any number of additional devices, such as additional computers, routers, and switches, to facilitate communications among the devices of the system 100.

Figure 2:
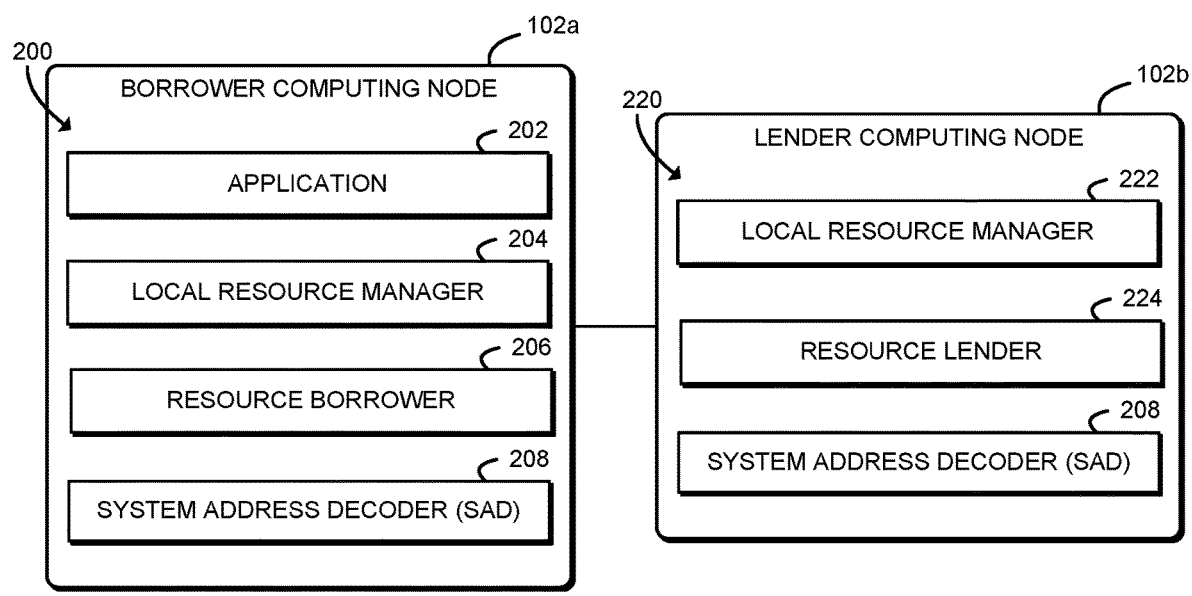
FIG. 2 is a simplified block diagram of at least one embodiment of various environments that may be established by borrower and lender computing nodes of the system of FIG. 1.

Referring now to FIG. 2, in an illustrative embodiment, a computing node 102a establishes an environment 200 during operation, and a computing node 102b establishes an environment 220 during operation. It should be appreciated that, in some embodiments the roles of the computing nodes 102a, 102b and their respective environments 200, 220 may be reversed for communication in the other direction (i.e., the computing node 102b may establish the environment 200 to send a resource access request, and/or the computing node 102a may establish the environment 220 to advertise available resources).

The illustrative environment 200 of the borrower computing node 102a includes an application 202, a local resource manager 204, a resource borrower 206, and one or more system address decoders (SAD) 210. The various components of the environment 200 may be embodied as hardware, firmware, software, or a combination thereof. As such, in some embodiments, one or more of the components of the environment 200 may be embodied as circuitry or collection of electrical devices (e.g., application circuitry 202, local resource manager circuitry 204, resource borrower circuitry 206, and/or system address decoder (SAD) circuitry 208). It should be appreciated that, in such embodiments, one or more of the application circuitry 202, the local resource manager circuitry 204, the resource borrower circuitry 206, and/or the system address decoder (SAD) circuitry 208 may form a portion of the processor 120, the host fabric interface 130, the I/O subsystem 132, the communication circuitry 138, the machine learning resource borrower 140, and/or other components of the borrower computing node 102a. Additionally, in some embodiments, one or more of the illustrative components may form a portion of another component and/or one or more of the illustrative components may be independent of one another.

The application 202 of the borrower computing node 102a is configured to generate an access to a local address in a local address space. The local address space may be embodied as, for example, a memory address space or a storage address space. It should be appreciate that the application 202 may be executed by a processor core 122 and thus the access may be generated by the processor core 122. As described further below, the borrower computing node 102a determines whether the local address is mapped to remote resource of a lender computing device 102b.

The local resource manager 204 of the borrower computing node 102a is configured to manage local resources of the borrower computing node 102a. For example, the local resource manager 204 is configured to determine whether additional resources are required by the borrower computing node 102a. The required additional resources may be, for example, memory resources and/or storage resources. If the local resource manager 204 determines that additional resources are required, the local resource manager 204 is configured to send a request for remote resources to a lender computing node 102b that has available resources. As discussed further below, the local resource manager 204 may be configured to send the resource request in response to receiving an advertisement of resource availability from the lender computing node 102b. The local resource manager 204 is further configured to configure a mapping of a local address space of the borrower computing node 102a to the remote resources of the lender computing node 102b in response to sending the resource request. To do so, the local resource manager 204 may configure a system address decoder 208 of a caching agent 124 to map the local address space to the host fabric interface 130, and configure a system address decoder 208 of the host fabric interface 130 to map the local address space to the remote resources of the lender computing node 102b. In addition, the local resource manager 204 may be configured to send a hot-plug notification to an operating system of the borrower computing node 102a in response to configuring the mapping, to notify the operating system that the remote resource is available and accessible. Additionally, if the lender computing node 102b reclaims the borrowed remote resource of the lender computing node 102b, the local resource manager 204 may be configured to remove the mapping. In addition, the local resource manager 204 may also be configured to send a hot-unplug notification to the operating system of the borrower computing node 102a in response to configuring the mapping, to notify the operating system that the remote resource is no longer accessible.

In some embodiments, the local resource manager 204 may be further configured to determine whether additional resources are required with a machine learning algorithm executed using the machine learning resource borrower 140, such as a neural network or convolutional neural network algorithm. The machine learning algorithm may be based on one or more of an application need, a service level objective, a data center policy, a dynamic condition, a resource demand history, and/or other factors.

The resource borrower 206 of the borrower computing node 102a is configured to access remote resources of a lender computing node 102b in response to the determination that additional resources are required by the borrower computing node 102a. To do so, the resource borrower 206 is configured to identify the lender computing node 102b based on the local address using the mapping of the local address space to the remote resources of the lender computing node 102b. The resource borrower 206 is further configured to perform a resource access operation with the lender computing node 102b over the network 104 fabric in response to identifying the lender computing node 102b. Additionally, if the resource borrower 206 receives a request to release the borrowed resource of the lender computing node 102b, the resource borrower 206 is configured to reflow data from the remote resources to the local resources of the borrower computing node 102a. It should be appreciated that, in some embodiments, the resource borrower 206 may be incorporated in, or otherwise form a portion of, the host fabric interface 130.

As described above, the borrower computing node 102a may include multiple system address decoders 208. A system address decoder 208 may be incorporated in, or otherwise form a portion of, the caching agent 124 to map the local address space to the host fabric interface 130. In addition, a system address decoder 208 may be incorporated in, or otherwise form a portion of, the host fabric interface 130 to map the local address to a remote resource of a lender compute node 102b. As such, the borrower computing node 102a may access the remote resource based on the mapping.

Still referring to FIG. 2, the illustrative environment 220 of the lender computing node 102b includes a local resource manager 222, a resource lender 224, and one or more system address decoders (SAD) 210. The various components of the environment 220 may be embodied as hardware, firmware, software, or a combination thereof. As such, in some embodiments, one or more of the components of the environment 220 may be embodied as circuitry or collection of electrical devices (e.g., local resource manager circuitry 222, resource lender circuitry 224, and/or system address decoder (SAD) circuitry 208). It should be appreciated that, in such embodiments, one or more of the local resource manager circuitry 222, the resource lender circuitry 224, and/or the system address decoder (SAD) circuitry 208 may form a portion of the processor 120, the host fabric interface 130, the I/O subsystem 132, the communication circuitry 138, the machine learning resource borrower, and/or other components of the lender computing node 102b. Additionally, in some embodiments, one or more of the illustrative components may form a portion of another component and/or one or more of the illustrative components may be independent of one another.

The local resource manager 222 of the lender computing node 102b is configured to manage local resources of the lender computing node 102b. For example, the local resource manager 222 is configured to determine whether the lender computing node 102b has available resources to lend to borrower computing nodes 102a. It should be appreciated that the available resources may be memory resources and/or storage resources of the lender computing node 102b. If the local resource manager 222 determines that the lender computing node 102b has an available resource, the local resource manager 222 is configured to advertise a resource availability to borrower computing nodes 102a over the network 104 fabric. The local resource manager 222 is further configured to receive a resource request from a borrower computing node 102a to borrow the advertised available resource in response to advertising the resource availability.

The local resource manager 222 is further configured to configure a mapping of a local address space of the lender computing node 102b to indicate that the local resource is remotely owned by a borrower computing node 102a. In addition, in some embodiments, the local resource manager 222 may send a hot-unplug notification to an operating system of the lender computing node 102b in response to configuring the mapping to notify the operating system that that local resource is no longer accessible. For example, the local resource manager 222 may generate a software interrupt to notify the operating system. Additionally, the local resource manager 222 may be configured to determine whether to reclaim the local resource that is remotely owned by the borrower computing node 102a. If the local resource manager 222 determines to reclaim the local resource, the local resource manager 222 may be configured to send a reclaim request to the borrower computing node 102a and to configure the mapping of local address space to indicate that the resource that was previously remotely owned is now locally owned. In addition, the local resource manager 222 may also be configured to send a hot-plug notification to the operating system of the lender computing node 102b in response to configuring the mapping, to notify the operating system that the local resource is available and accessible.

In some embodiments, the local resource manager 222 may be further configured to determine the local resource availability with a machine learning algorithm, using the machine learning resource borrower 140. As described above, the machine learning algorithm may be based on one or more of an application need, a service level objective, a data center policy, a dynamic condition, or a resource demand history.

The resource lender 224 of the lender computing node 102b is configured to allow remote access by a borrower computing node 102a in response to the determination of resource availability of the lender computing node 102b. The resource lender 224 may be configured to perform a resource access operation to the local resource with the borrower computing node 102a over the network 104 fabric. It should be appreciated that, in some embodiments, the resource lender 224 may be incorporated in, or otherwise form a portion of, the host fabric interface 130.

Figure 3A:
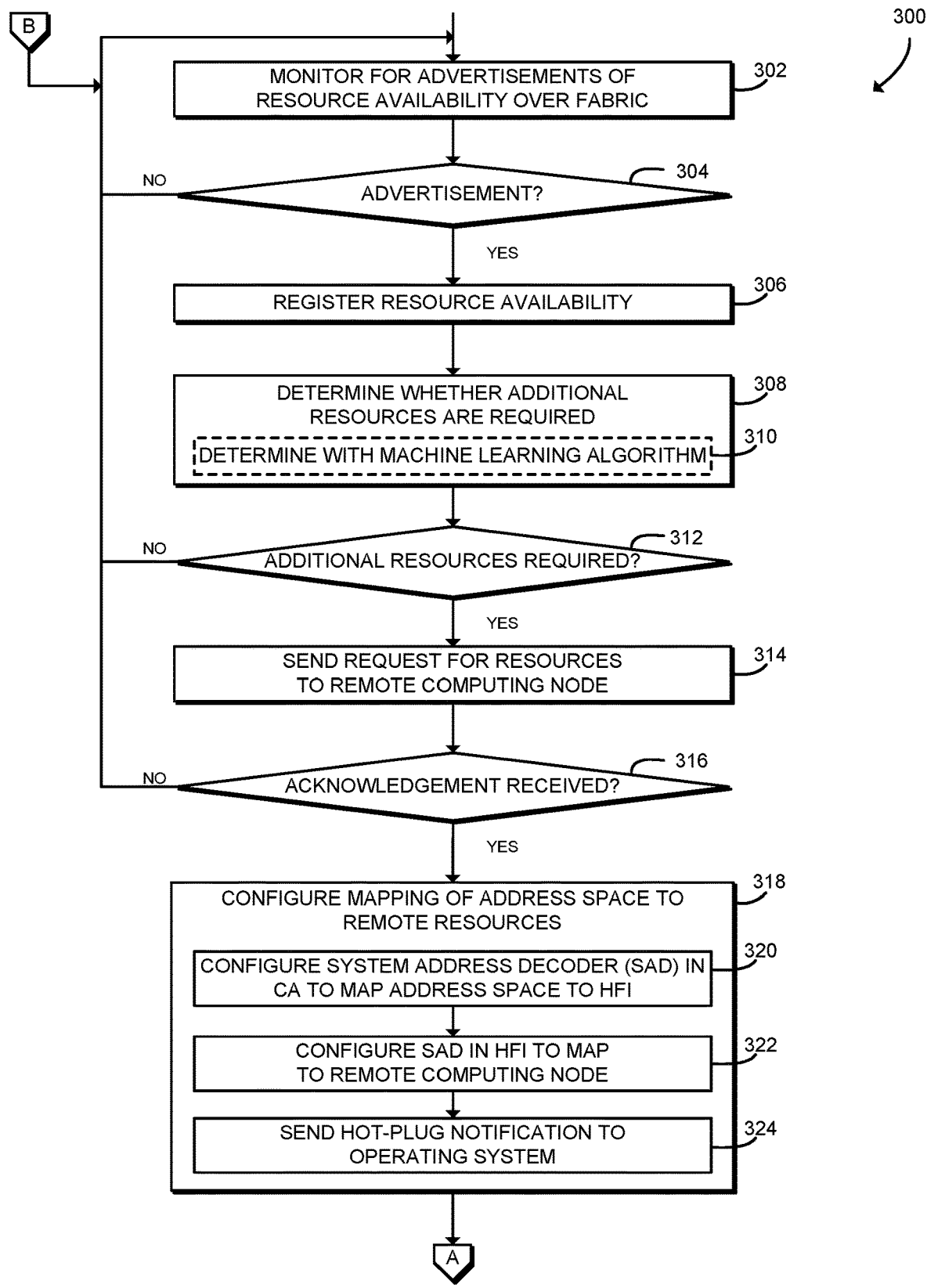
FIGS. 3A and 3B are a simplified flow diagram of at least one embodiment of a method for configuring a local address space to access remote resources of a remote computing node that may be executed by a borrower computing node of the system of FIGS. 1 and 2.
Figure 3B:
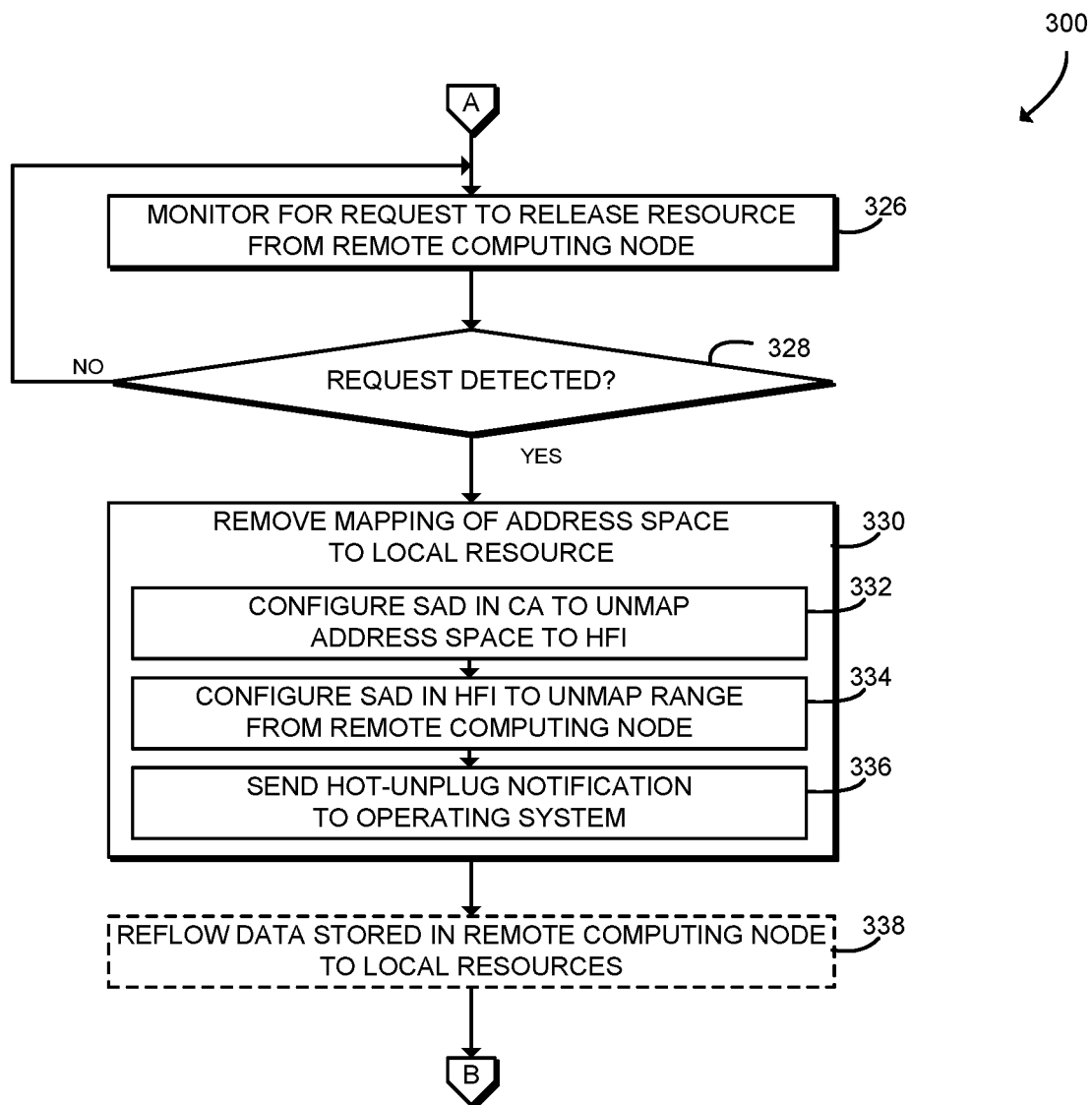

Referring now to FIGS. 3A and 3B, in use, a borrower computing node 102a may execute a method 300 for configuring a local address space of the borrower computing node 102a to access remote resources of a lender computing node 102b. The method 300 begins with block 302, in which the borrower computing node 102a monitors for advertisements of resource availability from one or more remote computing nodes (e.g., lender computing nodes 102b) over the network 104 fabric. For example, the advertisements may be broadcast, multicast, and/or unicast over the network 104 by a remote lender computing node 102b. In block 304, the borrower computing node 102a determines whether an advertisement has been received. If not, the method 300 loops back to block 302 to continue monitoring for advertisements of resource availability. If, however, the borrower computing node 102a detects an advertisement from a remote computing node indicating resource availability, the method 300 advances to block 306. In block 306, the borrower computing node 102a registers the resource availability.

In block 308, the borrower computing node 102a determines whether additional resources are required by the borrower computing node 102a. The additional resources may be embodied as, for example, memory resources, storage resources, and/or other computing resources (e.g., resources provided by one or more peripheral devices 142). The borrower computing node 102a may use any resource monitoring policies, algorithms, or other techniques to determine whether additional resources are required. For example, the resources may be required in response to one or more resource availability probes issued by an operating system, application, or other process of the borrower computing node 102*a*. Additionally or alternatively, the additional resources may be requested by a network orchestrator, system administrator, or other configuration function. In some embodiments, in block 310, the borrower computing node 102*a* may determine whether additional resources are required with a machine learning algorithm. As described above, the machine learning algorithm may be based on at least one of application needs, service level objectives, data center policies, dynamic conditions, and/or resource demand histories. In some embodiments, the borrower computing node 102*a* may use one or more performance counters as input to the machine learning algorithm. The machine learning algorithm may be executed using the MLRB 140, which may autonomously monitor the usage of resources on a continuous, moving window basis. The MLRB 140 may make trained recommendations on resource usage (e.g., borrowing additional resources, releasing resources, etc.) back to software. Thus, the MLRB 140 may allow software to avoid continuously monitoring and processing requests for sharing resources.

In block 312, the borrower computing node 102*a* checks whether additional resources are required. If not, the method 300 loops back to block 302 to continue monitoring for advertisements of resource availability from remote computing nodes. If, however, the borrower computing node 102*a* determines that additional resources are required, the method 300 advances to block 314.

In block 314, in response to determining that the additional resources are required by the borrower computing node 102*a*, the borrower computing node 102*a* sends a request for resources to the lender computing node 102*b* that advertised the available resource. Subsequent to sending the resource request, in block 316, the borrower computing node 102*a* determines whether an acknowledgement has been received from the lender computing node 102*b* in response to the resource request. As described further below, the acknowledgment may indicate that the remote resources have successfully been assigned to the borrower computing node 102*a*. In some embodiments, a partial acknowledgment may be received that indicates that only a part of the requested remote resources have been assigned to the borrower computing node 102*a*. If the borrower computing node 102*a* determines that an acknowledgement has not been received from the lender computing node 102*b*, the method 300 loops back to block 302 to continue monitoring for advertisements of resource availability from remote computing nodes. If, however, the borrower computing node 102*a* determines that the acknowledgment has been received from the lender computing node 102*b*, the method 300 advances to block 318.

In block 318, the borrower computing node 102*a* configures a mapping of a local address space to the remote resources of the lender computing node 102*b* in response to receiving the acknowledgment. The local address space may be embodied as a linear or physical memory address space, a PCI address space, or other local address space of the borrower computing node 102*a*. To perform the mapping, in block 320, the borrower computing node 102*a* configures a system address decoder (SAD) in a caching agent (CA) 124 to map the local address space to the host fabric interface (HFI) 130. For example, SAD may map a local address space including the memory address, storage address, or other appropriate address associated with the remote resource to the HFI 130. In block 322, the borrower computing node 102*a* configures a system address decoder in the host fabric interface 130 to map the local address space to the lender computing node 102*b*. For example, the system address decoder may map the local address space to a remote network address of the lender computing node 102*b*. In block 324, the borrower computing node 102*a* sends a hot-plug notification to an operating system of the borrower computing node 102*a* in response to configuring the system address decoders. The borrower computing node 102*a* may use any appropriate technique to send the hot-plug notification, such as generating an interrupt or otherwise notifying the operating system. The hot-plug notification notifies the operating system of the borrower computing node 102*a* that the remote resource of the lender computing node 102*b* is accessible by the operating system of the borrower computing node 102*a*. After sending the hot-plug notification, the method 300 advances to block 326, shown in FIG. 3B. Additionally or alternatively, although illustrated as configuring the SADs of the CA 124 and HFI 130 in response to receiving the acknowledgment, it should be appreciated that, in some embodiments, the mapping may be configured at a different time, for example in response to sending the resource request to the lender computing node 102*b*.

Referring now to FIG. 3B, in block 326, the borrower computing node 102*a* monitors for a request to release the borrowed resource(s) from the remote lender computing node 102*b*. In block 328, the borrower computing node 102*a* determines whether a release request has been received. If not, the method 300 loops back to block 326 to continue monitoring for a release request from the lender computing node 102*b*. If, however, the borrower computing node 102*a* determines that the release request has been received, the method 300 advances to block 330.

In block 330, the borrower computing node 102*a* removes the mapping of the local address space to the remote resource. To do so, in block 332, the borrower computing node 102*a* configures the system address decoder in the caching agent 124 to unmap the address space to the host fabric interface 130. In block 334, the borrower computing node 102*a* configures the system address decoder in the host fabric interface 130 to unmap the address space from the lender computing node 102*b*. Additionally, in block 336, the borrower computing node 102*a* sends a hot-unplug notification to the operating system of the lender computing node 102*b* in response to removing the mapping. As described above, the hot-unplug notification notifies the operating system of the borrower computing node 102*a* that the remote resource that was borrowed from the lender computing node 102*b* is no longer accessible by the operating system of the borrower computing node 102*a*.

In some embodiments, in block 338, the borrower computing node 102*a* may reflow data that was stored in the remote resource of the lender computing node 102*b* to one or more local resource of the borrower computing node 102*a*. After removing the mapping, the method 300 loops back to block 302 to continue monitoring for advertisement of resource availability.

Figure 4:
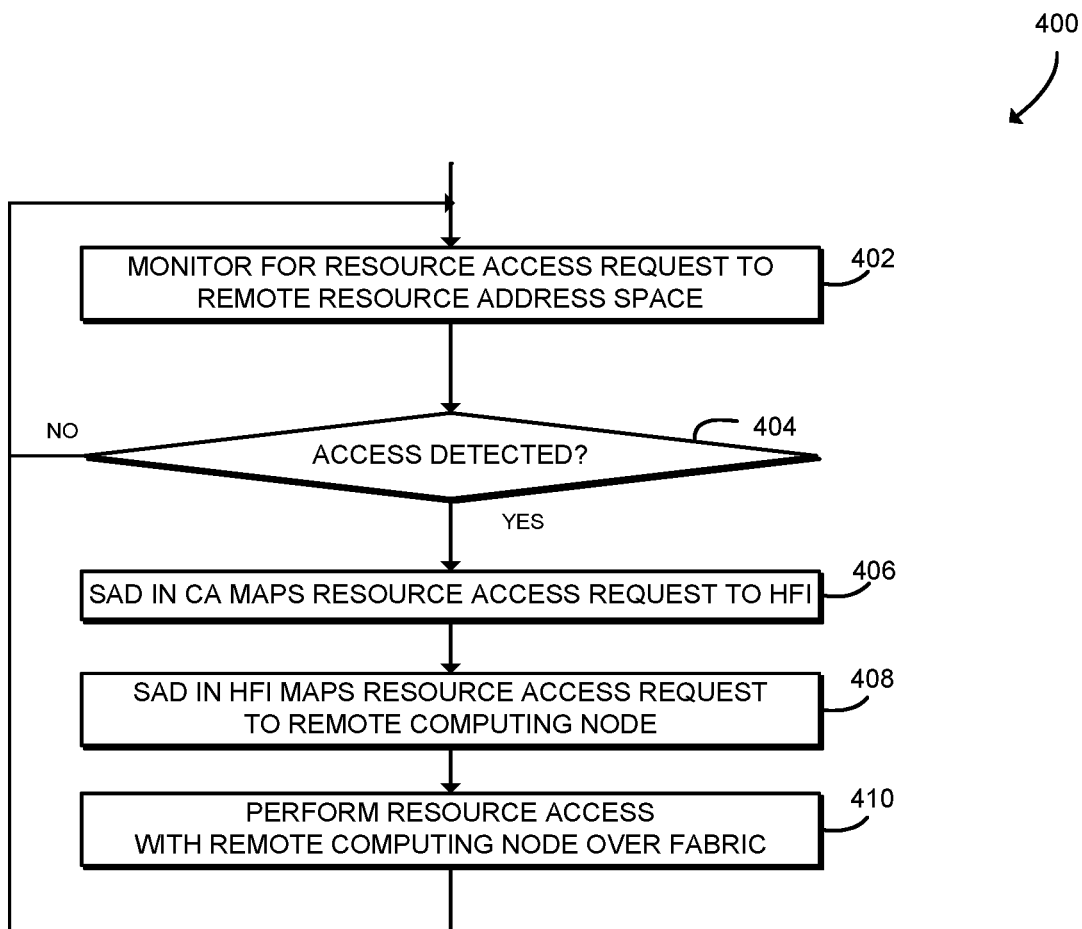
FIG. 4 is a simplified flow diagram of at least one embodiment of a method for accessing a remote resource of the remote computing node that may be executed by the borrower computing node of the system of FIGS. 1 and 2.

Referring now to FIG. 4, in use, the borrower computing node 102*a* may execute a method 400 for accessing the available remote resource of the lender computing node 102*b*. The method 400 may be executed, for example, after configuring the SADs of the CA 124 and the HFI 130 to access the remote resources of the lender computing node 102*b*, as described above in connection with FIGS. 3A-3B. Accordingly, the method 400 may be executed using hardware resources of the borrower computing node 102*a*, including the CA 124 and the HFI 130. The method 400 begins with block 402, in which the borrower computing node 102*a* monitors for a resource access request generated within the borrower computing node 102*a* (i.e., any component of the borrower computing node 102*a* that requires additional resources) that is mapped to a remote resource address space. The resource access request may be embodied as a memory request, storage request, or other request to a local address space of the borrower computing node 102*a* that has been mapped to the lender computing node 102*b*. The resource request may be generated, for example, by a processor core 122 or other component of the processor 120 that accesses resources of the borrower computing node 102*a*. Continuing that example, the resource request may be generated by a processor core 122 during execution of the application 202. The access request may be detected by monitoring an internal ring, bus, or other communication interface of the processor 120, the I/O subsystem 132, or other components of the computing node 102*a*.

In block 404, the borrower computing node 102*a* determines whether a resource access request to the remote resource address space was detected. If not, the method 400 loops back to block 402 to continue monitoring for a remote resource access request. If, however, the borrower computing node 102*a* detects the remote resource access request, the method 400 advances to block 406.

In block 406, the system address decoder in the caching agent 124 maps the resource access request to the host fabric interface 130, based on the mapping of the local address space of the borrower computing node 102*a* to the host fabric interface 130. In block 408, the system address decoder in the host fabric interface 130 of the borrower computing node 102*a* maps the resource access request to the lender computing node 102*b*. Once the resource access request is mapped to the remote memory address of the lender computing node 102*b*, in block 410 the borrower computing node 102*a* performs a remote resource access operation with the lender computing node 102*b* over the network 104 fabric. For example, the borrower computing node 102*a* may read, write, or otherwise access data stored in the remote resource of the lender computing node 102*b*. Any resulting data may be forwarded back to the entity that originated the resource request (e.g., the originating processor core 122). After performing the resource access operation, the method 400 loops back to block 402 to continue monitoring for resource access requests.

Figure 5A:
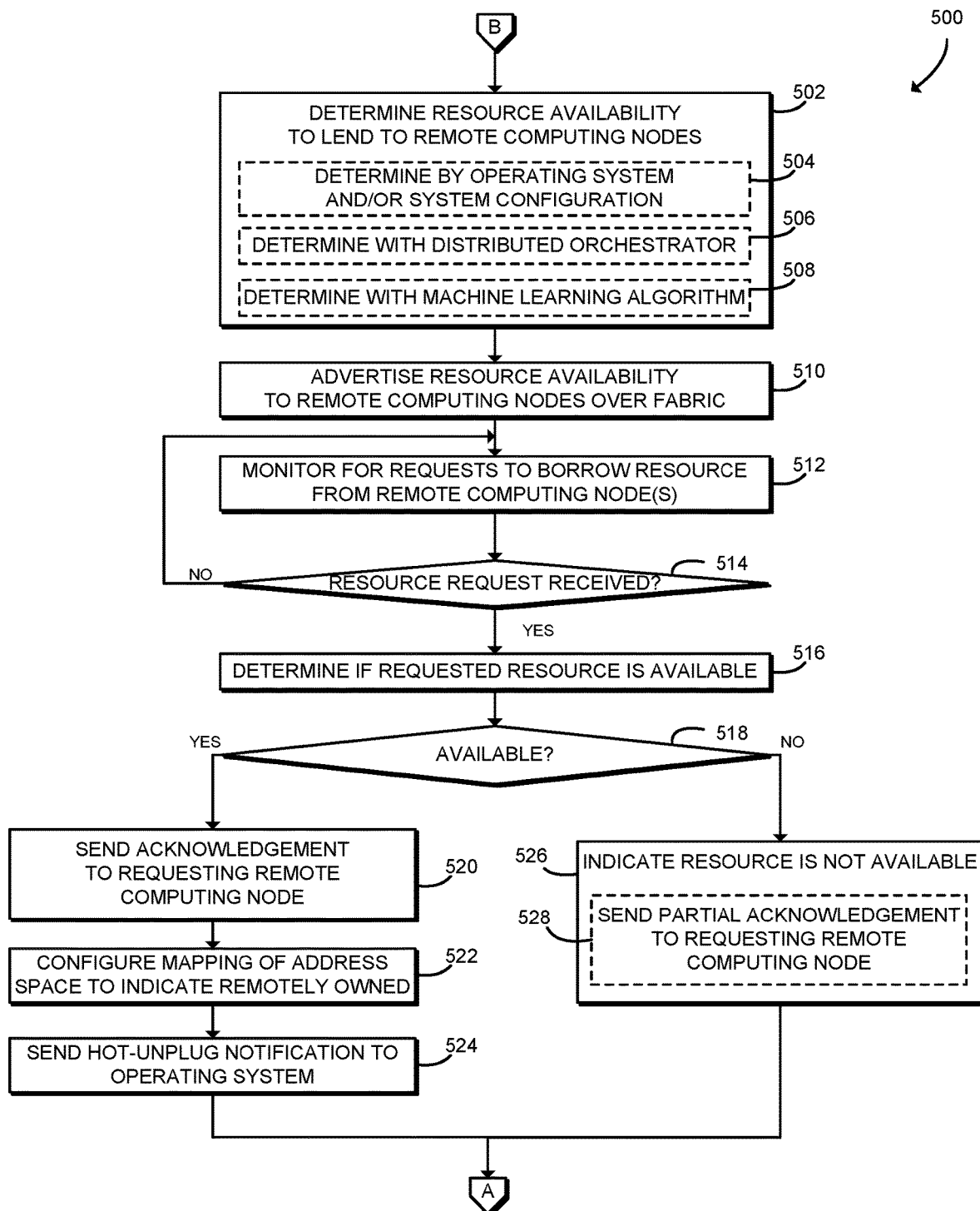
FIGS. 5A and 5B are a simplified flow diagram of at least one embodiment of a method for lending available resources to remote computing nodes that may be executed by a lender computing node of the system of FIGS. 1 and 2.
Figure 5B:
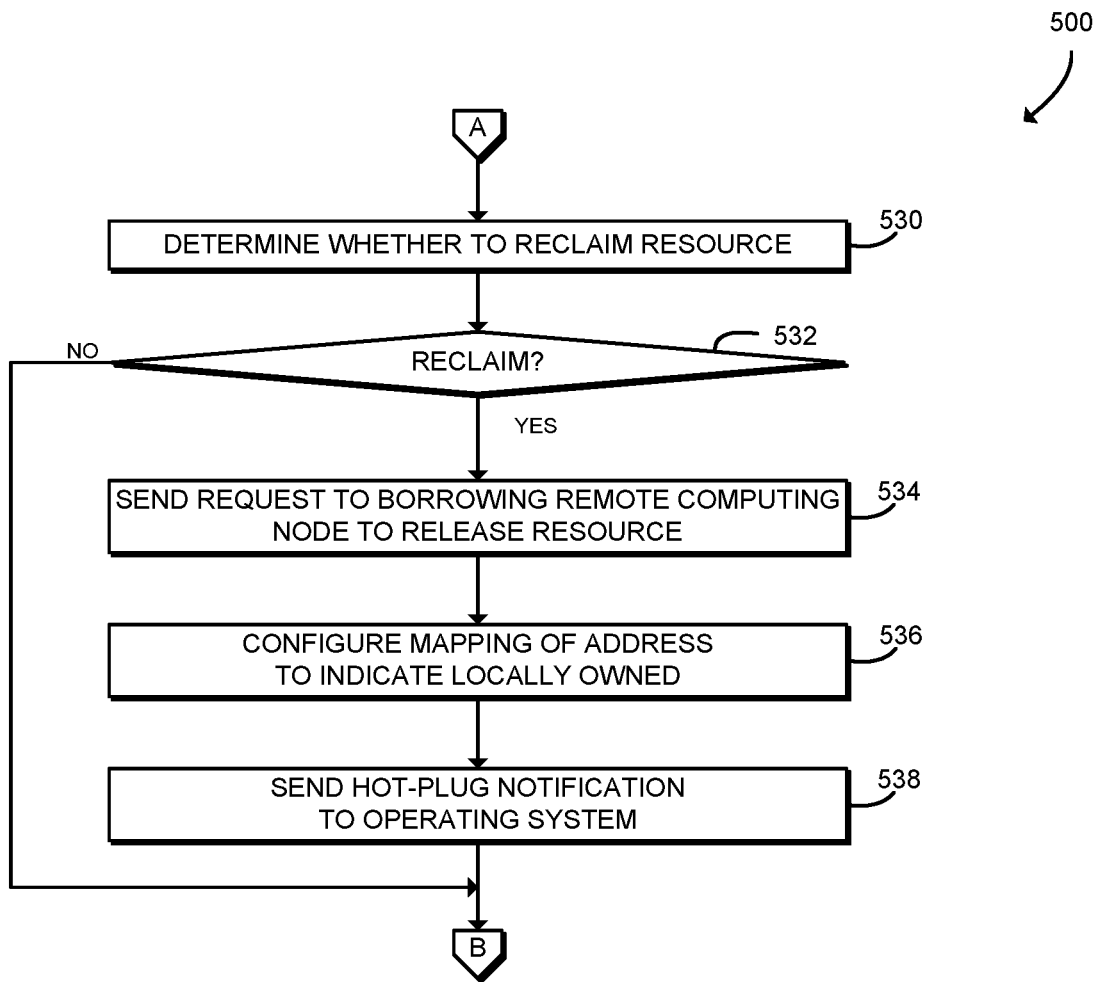

Referring now to FIGS. 5A and 5B, in use, the lender computing node 102*b* may execute a method 500 for lending available local resources to a borrower computing node 102*a*. The method 500 begins with block 502, in which the lender computing node 102*b* determines local resources available on the lender computing node 102*b* to lend to remote borrower computing nodes 102*a*. It should be appreciated that, in some embodiments, the local resource may be a local memory resource of the lender computing node 102*b*. In other embodiments, the local resource may be a local storage resource of the lender computing node 102*b*, and/or other computing resource of the lender computing node 102*b*.

In some embodiments, in block 504 the lender computing node 102*b* may determine the resource availability by an operating system and/or a system configuration of the lender computing node 102*b*. In some embodiments, in block 506 the lender computing node 102*b* may determine the local resource availability with a distributed orchestrator. The distributed orchestrator may be embodied as a computing node or other entity of the system 100 that allocates resources among the various computing nodes 102. In some embodiments, in block 508 the lender computing node 102*b* may determine the local resource availability with a machine learning algorithm. As described above, the machine learning algorithm may be based on at least one of application needs, service level objectives, data center policies, dynamic conditions, and/or resource demand histories. In some embodiments, the borrower computing node 102*a* may use one or more performance counters as input to the machine learning algorithm. The machine learning algorithm may be executed using the MLRB 140, which may autonomously monitor the usage of resources on a continuous, moving window basis. The MLRB 140 may make trained recommendations on resource usage (e.g., borrowing additional resources, releasing resources, etc.) back to software. Thus, the MLRB 140 may allow software to avoid continuously monitoring and processing requests for sharing resources. For example, the MLRB 140 may track whether resources have remained unused for predefined periods of time, and may notify a software provided handler to allow the resources to be reclaimed.

In block 510, in response to determining that the local resource is available, the lender computing node 102*b* advertises the resource availability to one or more borrower computing nodes 102*a* over the network 104 fabric. For example, the lender computing node 102*b* may send advertisements to multiple borrower computing nodes 102*a* using broadcast, multicast, and/or unicast transmissions over the network 104.

In block 512, the lender computing node 102*b* monitors for requests from one or more borrower computing nodes 102*a* to borrow a local resource in response to advertising the resource availability. In block 514, the lender computing node 102*b* determines whether a resource request has been received from a borrower computing node 102*a*. If the lender computing node 102*b* determines that a resource request has not been received, the method 500 loops back to block 512 to continue to monitor for resource requests from borrower computing nodes 102*a*. If, however, the lender computing node 102*b* determines that a resource request has been received from the borrower computing node 102*a*, the method 500 advances to block 516.

In block 516, the lender computing node 102*b* determines if the resource requested by the borrower computing device 102*a* is still available to lend to the borrower computing device 102*a*. In block 518, the lender computing node 102*b* checks whether the requested resource is still available. If not, the method 500 branches to block 526, described further below. If the resource is still available, the method 500 branches to block 520.

In block 520, the lender computing node 102*b* sends an acknowledgement to the requesting borrower computing node 102*a* indicating that the requested local resource is still available. In response to sending the acknowledgement, in block 522, the lender computing node 102*b* configures a mapping of a local address space that includes the local resource to indicate that the local resource is remotely owned. In block 524, the lender computing node 102*b* sends a hot-unplug notification to the operating system of the lender computing node 102*b*. The hot-unplug notification notifies the operating system of the lender computing node 102*b* that the local resource is now remotely owned and is thus not accessible by the operating system of the lender computing node 102*b*. After sending the hot-unplug notification, the method 500 advances to block 530, shown in FIG. 5B.

Referring back to block 518, if the lender computing node 102*b* determines that the requested resource is not available, the method 500 branches to block 526, in which the lender computing node 102b indicates that the requested resource is no longer available. To do so, in some embodiments, in block 528 the lender computing node 102b may send a partial acknowledgement to the requesting borrower computing node 102a. For example, the partial acknowledgment may indicate that less than all of the requested local resource is available. After indicating that the resource is not available, the method 500 advances to block 530 shown in FIG. 5B.

Referring now to FIG. 5B, in block 530 the lender computing node 102b determines whether to reclaim a local resource that is remotely owned by a remote borrower computing node 102a. In some embodiments, the machine learning algorithm may be used to determine whether to reclaim the local resource, as described above. In block 532, the lender computing node 102b checks whether to reclaim a resource. If not, the method 500 loops back to block 502, shown in FIG. 5A, to continue determining resource availability. If, however, the lender computing node 102b determines to reclaim the local resource, the method 500 advances to block 534.

In block 534, the lender computing node 102b sends a release request to the remote borrower computing node 102a to reclaim the local resource. Once the borrower computing node 102a releases the borrowed resource in response to receiving the release request, in block 536, the lender computing node 102b configures the mapping of local address space to indicate that the local resource is now locally owned. In block 538, the lender computing node 102b sends a hot-plug notification to the operating system of the lender computing node 102b in response to configuring the mapping. The hot-plug notification notifies the operating system of the lender computing node 102b that the local resource that has been previously remotely owned is now accessible by the operating system of the lender computing node 102b.

It should be appreciated that, in some embodiments, the methods 300, 400, and/or 500 may be embodied as various instructions stored on a computer-readable media, which may be executed by the processor 120, the I/O subsystem 132, the HFI 130, and/or other components of a computing node 102 to cause the computing node 102 to perform the respective method 300, 400 and/or 500. The computer-readable media may be embodied as any type of media capable of being read by the computing node 102 including, but not limited to, the memory 134, the data storage device 136, firmware devices, and/or other media.

EXAMPLES

Illustrative examples of the technologies disclosed herein are provided below. An embodiment of the technologies may include any one or more, and any combination of, the examples described below.

Example 1 includes a computing node for remote resource usage, the computing node comprising: one or more processors; one or more memory devices having stored therein a plurality of instructions that, when executed by the one or more processors, cause the computing node to: determine whether additional resources are required by the computing node; send a resource request for remote resources to a remote computing node in response to a determination that the additional resources are required by the computing node; configure a mapping of a local address space of the computing node to the remote resources of the remote computing node in response to sending of the resource request; and generate an access to a local address in the local address space in response to configuration of the mapping; and a network interface controller to: identify the remote computing node based on the local address with the mapping of the local address space to the remote resources of the remote computing node in response to generation of the access to the local address; and perform a resource access operation with the remote computing node over a network fabric in response to identification of the remote computing node.

Example 2 includes the subject matter of Example 1, and wherein the plurality of instructions, when executed, further cause the computing node to monitor for available resources advertised by the remote computing node over the network fabric.

Example 3 includes the subject matter of any of Examples 1 and 2, and wherein to configure the mapping of the local address space to the remote resources comprises to configure one or more system address decoders of the computing node to map the local address space to the remote resources of the remote computing node.

Example 4 includes the subject matter of any of Examples 1-3, and wherein to configure one or more system address decoders comprises to: configure a first system address decoder of a caching agent of the computing node to map the local address space to a host fabric interface of the computing node; and configure a second system address decoder of the host fabric interface to map the local address space to the remote resources of the remote computing node.

Example 5 includes the subject matter of any of Examples 1-4, and wherein to configure the mapping of the local address space to the remote resources further comprises to send a hot-plug notification to an operating system of the computing node in response to configuration of the one or more system address decoders.

Example 6 includes the subject matter of any of Examples 1-5, and further comprising a host fabric interface, wherein the host fabric interface comprises the network interface controller.

Example 7 includes the subject matter of any of Examples 1-6, and further comprising a machine learning resource borrower to determine whether additional resources are required with a machine learning algorithm.

Example 8 includes the subject matter of any of Examples 1-7, and wherein the machine learning algorithm is based on one or more of an application need, a service level objective, a data center policy, a dynamic condition, or a resource demand history.

Example 9 includes the subject matter of any of Examples 1-8, and wherein the plurality of instructions, when executed, further cause the computing node to: receive a release request, from the remote computing node, to release resources; and remove the mapping of the local address space to the remote resources in response to a receipt of the release request.

Example 10 includes the subject matter of any of Examples 1-9, and wherein the plurality of instructions, when executed, further cause the computing node to reflow data from the remote resources of the remote computing node to local resources of the computing node in response to removal of the mapping.

Example 11 includes the subject matter of any of Examples 1-10, and wherein the additional resources comprises memory resources, the remote resources comprises memory resources of the remote computing node, and the local address space comprises a memory address space of the computing node.

Example 12 includes the subject matter of any of Examples 1-11, and wherein the additional resources comprises storage resources, the remote resources comprises storage resources of the remote computing node, and the local address space comprises a storage address space of the computing node.

Example 13 includes a computing node for remote resource access, the computing node comprising: one or more processors; one or more memory devices having stored therein a plurality of instructions that, when executed by the one or more processors, cause the computing node to: determine local resource availability to lend to remote computing nodes; and a network interface controller to: advertise the local resource availability to remote computing nodes over a network fabric in response to a determination of the local resource availability; and receive a resource request to borrow a local resource from a remote computing node in response to advertisement of the local resource availability; wherein the plurality of instructions, when executed, further cause the computing node to: determine whether the local resource is available in response to receipt of the resource request; and configure a mapping of a local address space that includes the local resource to indicate the local resource is remotely owned in response to a determination that the local resource is available.

Example 14 includes the subject matter of Example 13, and wherein the network interface controller is further to send a hot-unplug notification to an operating system of the computing node in response to configuration of the mapping.

Example 15 includes the subject matter of any of Examples 13 and 14, and wherein the plurality of instructions, when executed, further cause the computing node to: determine whether to reclaim the local resource in response to configuration of the mapping; send a release request to the remote computing node in response to a determination to reclaim the local resource; and configure the mapping of the local address space to indicate that the local resource is locally owned in response to the determination to reclaim the requested resource.

Example 16 includes the subject matter of any of Examples 13-15, and wherein the network interface controller is further to perform a resource access operation to the local resource with the remote computing node over the network fabric in response to configuration of the mapping.

Example 17 includes the subject matter of any of Examples 13-16, and further comprising a host fabric interface, wherein the host fabric interface comprises the network interface controller.

Example 18 includes the subject matter of any of Examples 13-17, and further comprising a machine learning resource borrower to determine the local resource availability with a machine learning algorithm.

Example 19 includes the subject matter of any of Examples 13-18, and wherein the machine learning algorithm is based on one or more of an application need, a service level objective, a data center policy, a dynamic condition, or a resource demand history.

Example 20 includes the subject matter of any of Examples 13-19, and wherein: the plurality of instructions, when executed, further cause the computing node to send an acknowledgment to the remote computing node in response to the determination that the local resource is available; and to configure the mapping comprises to configure the mapping in response to sending of the acknowledgment.

Example 21 includes the subject matter of any of Examples 13-20, and wherein the plurality of instructions, when executed, further cause the computing node to send a partial acknowledgment to the remote computing node in response to a determination that the local resource is not available, wherein the partial acknowledgment is indicative of less than all of the local resource.

Example 22 includes the subject matter of any of Examples 13-21, and wherein the local resource comprises a memory resource of the computing node, and the local address space comprises a memory address space of the computing node.

Example 23 includes the subject matter of any of Examples 13-22, and wherein the requested resource comprises a storage resource of the computing node, and the local address space comprises a storage address space of the computing node.

Example 24 includes a method for remote resource usage, the method comprising: determining, by a computing node, whether additional resources are required by the computing node; sending, by the computing node, a resource request for remote resources to a remote computing node in response to determining that the additional resources are required by the computing node; configuring, by the computing node, a mapping of a local address space of the computing node to the remote resources of the remote computing node in response to sending the resource request; generating, by the computing node, an access to a local address in the local address space in response to configuring the mapping; identifying, by the computing node, the remote computing node based on the local address using the mapping of the local address space to the remote resources of the remote computing node in response to generating the access to the local address; and performing, by the computing node, a resource access operation with the remote computing node over a network fabric in response to identifying the remote computing node.

Example 25 includes the subject matter of Example 24, and further comprising monitoring, by the computing node, for available resources advertised by the remote computing node over the network fabric.

Example 26 includes the subject matter of any of Examples 24 and 25, and wherein configuring the mapping of the local address space to the remote resources comprises configuring one or more system address decoders of the computing node to map the local address space to the remote resources of the remote computing node.

Example 27 includes the subject matter of any of Examples 24-26, and wherein configuring the one or more system address decoders comprises: configuring a first system address decoder of a caching agent of the computing node to map the local address space to a host fabric interface of the computing node; and configuring a second system address decoder of the host fabric interface to map the local address space to the remote resources of the remote computing node.

Example 28 includes the subject matter of any of Examples 24-27, and wherein configuring the mapping of the local address space to the remote resources further comprises sending a hot-plug notification to an operating system of the computing node in response to configuring the one or more system address decoders.

Example 29 includes the subject matter of any of Examples 24-28, and wherein: identifying the remote computing node based on the local address using the mapping comprises identifying, by a host fabric interface of the computing node, the remote computing node based on the local address using the mapping; and performing the resource access operation with the remote computing node over the network fabric comprises performing, by the host fabric interface, the resource access operation with the remote computing node.

Example 30 includes the subject matter of any of Examples 24-29, and wherein determining whether additional resources are required comprises determining whether additional resources are required with a machine learning algorithm.

Example 31 includes the subject matter of any of Examples 24-30, and wherein the machine learning algorithm is based on one or more of an application need, a service level objective, a data center policy, a dynamic condition, or a resource demand history.

Example 32 includes the subject matter of any of Examples 24-31, and further comprising: receiving, by the computing node, a release request from the remote computing node to release resources; and removing, by the computing node, the mapping of the local address space to the remote resources in response to receiving the release request.

Example 33 includes the subject matter of any of Examples 24-32, and further comprising reflowing, by the computing node, data from the remote resources of the remote computing node to local resources of the computing node in response to removing the mapping.

Example 34 includes the subject matter of any of Examples 24-33, and wherein the additional resources comprises memory resources, the remote resources comprises memory resources of the remote computing node, and the local address space comprises a memory address space of the computing node.

Example 35 includes the subject matter of any of Examples 24-34, and wherein the additional resources comprises storage resources, the remote resources comprises storage resources of the remote computing node, and the local address space comprises a storage address space of the computing node.

Example 36 includes a method for allowing remote resource usage, the method comprising: determining, by a computing node, local resource availability to lend to remote computing nodes; advertising, by the computing node, the local resource availability to remote computing nodes over a network fabric in response to determining the local resource availability; receiving, by the computing node, a resource request to borrow a local resource from a remote computing node in response to advertising the local resource availability; determining, by the computing node, whether the local resource is available in response to receiving the resource request; and configuring, by the computing node, a mapping of a local address space that includes the local resource to indicate the local resource is remotely owned in response to determining that the local resource is available.

Example 37 includes the subject matter of Example 36, and further comprising sending, by the computing node, a hot-unplug notification to an operating system of the computing node in response to configuring the mapping.

Example 38 includes the subject matter of any of Examples 36 and 37, and further comprising: determining, by the computing node, whether to reclaim the local resource in response to configuring the mapping; sending, by the computing node, a release request to the remote computing node in response to determining to reclaim the local resource, and configuring, by the computing node, the mapping of the local address space to indicate that the local resource is locally owned in response to determining to reclaim the local resource.

Example 39 includes the subject matter of any of Examples 36-38, and further comprising performing, by the computing node, a resource access operation to the local resource with the remote computing node over the network fabric in response to configuring the mapping.

Example 40 includes the subject matter of any of Examples 36-39, and wherein performing the resource access operation comprises performing the resource access operation by a host fabric interface of the computing node.

Example 41 includes the subject matter of any of Examples 36-40, and wherein determining the local resource availability comprises determining the local resource availability with a machine learning algorithm.

Example 42 includes the subject matter of any of Examples 36-41, and wherein the machine learning algorithm is based on one or more of an application need, a service level objective, a data center policy, a dynamic condition, or a resource demand history.

Example 43 includes the subject matter of any of Examples 36-42, and further comprising: sending, by the computing node, an acknowledgement to the remote computing node in response to determining that the local resource is available; wherein configuring the mapping comprises configuring the mapping in response to sending the acknowledgment.

Example 44 includes the subject matter of any of Examples 36-43, and further comprising sending, by the computing node, a partial acknowledgement to the remote computing node in response to determining that the local resource is not available, wherein the partial acknowledgment is indicative of less than all of the local resource.

Example 45 includes the subject matter of any of Examples 36-44, and wherein the local resource comprises a memory resource of the computing node, and the local address space comprises a memory address space of the computing node.

Example 46 includes the subject matter of any of Examples 36-45, and wherein the local resource comprises a storage resource of the computing node, and the local address space comprises a storage address space of the computing node.

Example 47 includes a computing device comprising: a processor; and a memory having stored therein a plurality of instructions that when executed by the processor cause the computing device to perform the method of any of Examples 24-46.

Example 48 includes one or more machine readable storage media comprising a plurality of instructions stored thereon that in response to being executed result in a computing device performing the method of any of Examples 24-46.

Example 49 includes a computing device comprising means for performing the method of any of Examples 24-46.

Example 50 includes a computing node for remote resource usage, the computing node comprising: local resource manager circuitry to: determine whether additional resources are required by the computing node; send a resource request for remote resources to a remote computing node in response to a determination that the additional resources are required by the computing node; and configure a mapping of a local address space of the computing node to the remote resources of the remote computing node in response to sending of the resource request; application circuitry to generate an access to a local address in the local address space in response to configuration of the mapping; and resource borrower circuitry to: identify the remote computing node based on the local address with the mapping of the local address space to the remote resources of the remote computing node in response to generation of the access to the local address; and perform a resource access operation with the remote computing node over a network fabric in response to identification of the remote computing node.

Example 51 includes the subject matter of Example 50, and wherein the local resource manager circuitry is further to monitor for available resources advertised by the remote computing node over the network fabric.

Example 52 includes the subject matter of any of Examples 50 and 51, and wherein to configure the mapping of the local address space to the remote resources comprises to configure one or more system address decoders of the computing node to map the local address space to the remote resources of the remote computing node.

Example 53 includes the subject matter of any of Examples 50-52, and wherein to configure one or more system address decoders comprises to: configure a first system address decoder of a caching agent of the computing node to map the local address space to a host fabric interface of the computing node; and configure a second system address decoder of the host fabric interface to map the local address space to the remote resources of the remote computing node.

Example 54 includes the subject matter of any of Examples 50-53, and wherein to configure the mapping of the local address space to the remote resources further comprises to send a hot-plug notification to an operating system of the computing node in response to configuration of the one or more system address decoders.

Example 55 includes the subject matter of any of Examples 50-54, and further comprising a host fabric interface, wherein the wherein the host fabric interface comprises the resource borrower circuitry.

Example 56 includes the subject matter of any of Examples 50-55, and further comprising machine learning resource borrower circuitry; wherein to determine whether additional resources are required comprises to determine whether additional resources are required with a machine learning algorithm by the machine learning resource borrower circuitry.

Example 57 includes the subject matter of any of Examples 50-56, and wherein the machine learning algorithm is based on one or more of an application need, a service level objective, a data center policy, a dynamic condition, or a resource demand history.

Example 58 includes the subject matter of any of Examples 50-57, and wherein the local resource manager circuitry is further to: receive a release request, from the remote computing node, to release resources; and remove the mapping of the local address space to the remote resources in response to a receipt of the release request.

Example 59 includes the subject matter of any of Examples 50-58, and wherein the resource borrower circuitry is further to reflow data from the remote resources of the remote computing node to local resources of the computing node in response to removal of the mapping.

Example 60 includes the subject matter of any of Examples 50-59, and wherein the additional resources comprises memory resources, the remote resources comprises memory resources of the remote computing node, and the local address space comprises a memory address space of the computing node.

Example 61 includes the subject matter of any of Examples 50-60, and wherein the additional resources comprises storage resources, the remote resources comprises storage resources of the remote computing node, and the local address space comprises a storage address space of the computing node.

Example 62 includes a computing node for remote resource access, the computing node comprising: local resource manager circuitry to: determine local resource availability to lend to remote computing nodes; advertise the local resource availability to remote computing nodes over a network fabric in response to a determination of the local resource availability; receive a resource request to borrow a local resource from a remote computing node in response to advertisement of the local resource availability; determine whether the local resource is available in response to receipt of the resource request; and configure a mapping of a local address space that includes the local resource to indicate the local resource is remotely owned in response to a determination that the local resource is available.

Example 63 includes the subject matter of Example 62, and wherein the local resource manager circuitry is further to send a hot-unplug notification to an operating system of the computing node in response to configuration of the mapping.

Example 64 includes the subject matter of any of Examples 62 and 63, and wherein the local resource manager circuitry is further to: determine whether to reclaim the local resource in response to configuration of the mapping; send a release request to the remote computing node in response to a determination to reclaim the local resource; and configure the mapping of the local address space to indicate that the local resource is locally owned in response to the determination to reclaim the requested resource.

Example 65 includes the subject matter of any of Examples 62-64, and further comprising resource lender circuitry to perform a resource access operation to the local resource with the remote computing node over the network fabric in response to configuration of the mapping.

Example 66 includes the subject matter of any of Examples 62-65, and further comprising a host fabric interface, wherein the host fabric interface comprises the resource lender circuitry.

Example 67 includes the subject matter of any of Examples 62-66, and further comprising machine learning resource borrower circuitry, wherein to determine the local resource availability comprises to determine the local resource availability with a machine learning algorithm by the machine learning resource borrower circuitry.

Example 68 includes the subject matter of any of Examples 62-67, and wherein the machine learning algorithm is based on one or more of an application need, a service level objective, a data center policy, a dynamic condition, or a resource demand history.

Example 69 includes the subject matter of any of Examples 62-68, and wherein: the local resource manager circuitry is further to send an acknowledgment to the remote computing node in response to the determination that the local resource is available; and to configure the mapping comprises to configure the mapping in response to sending of the acknowledgment.

Example 70 includes the subject matter of any of Examples 62-69, and wherein the local resource manager circuitry is further to send a partial acknowledgment to the remote computing node in response to a determination that the local resource is not available, wherein the partial acknowledgment is indicative of less than all of the local resource.

Example 71 includes the subject matter of any of Examples 62-70, and wherein the local resource comprises a memory resource of the computing node, and the local address space comprises a memory address space of the computing node.

Example 72 includes the subject matter of any of Examples 62-71, and wherein the requested resource comprises a storage resource of the computing node, and the local address space comprises a storage address space of the computing node.

Example 73 includes a computing node for remote resource usage, the computing node comprising: means for determining whether additional resources are required by the computing node; circuitry for sending a resource request for remote resources to a remote computing node in response to determining that the additional resources are required by the computing node; means for configuring a mapping of a local address space of the computing node to the remote resources of the remote computing node in response to sending the resource request; means for generating an access to a local address in the local address space in response to configuring the mapping; means for identifying the remote computing node based on the local address using the mapping of the local address space to the remote resources of the remote computing node in response to generating the access to the local address; and means for performing a resource access operation with the remote computing node over a network fabric in response to identifying the remote computing node.

Example 74 includes the subject matter of Example 73, and further comprising means for monitoring for available resources advertised by the remote computing node over the network fabric.

Example 75 includes the subject matter of any of Examples 73 and 74, and wherein the means for configuring the mapping of the local address space to the remote resources comprises means for configuring one or more system address decoders of the computing node to map the local address space to the remote resources of the remote computing node.

Example 76 includes the subject matter of any of Examples 73-75, and wherein the means for configuring the one or more system address decoders comprises: means for configuring a first system address decoder of a caching agent of the computing node to map the local address space to a host fabric interface of the computing node; and means for configuring a second system address decoder of the host fabric interface to map the local address space to the remote resources of the remote computing node.

Example 77 includes the subject matter of any of Examples 73-76, and wherein the means for configuring the mapping of the local address space to the remote resources further comprises means for sending a hot-plug notification to an operating system of the computing node in response to configuring the one or more system address decoders.

Example 78 includes the subject matter of any of Examples 73-77, and wherein: the means for identifying the remote computing node based on the local address using the mapping comprises means for identifying, by a host fabric interface of the computing node, the remote computing node based on the local address using the mapping; and the means for performing the resource access operation with the remote computing node over the network fabric comprises means for performing, by the host fabric interface, the resource access operation with the remote computing node.

Example 79 includes the subject matter of any of Examples 73-78, and wherein the means for determining whether additional resources are required comprises means for determining whether additional resources are required with a machine learning algorithm.

Example 80 includes the subject matter of any of Examples 73-79, and wherein the machine learning algorithm is based on one or more of an application need, a service level objective, a data center policy, a dynamic condition, or a resource demand history.

Example 81 includes the subject matter of any of Examples 73-80, and further comprising: circuitry for receiving a release request from the remote computing node to release resources; and means for removing the mapping of the local address space to the remote resources in response to receiving the release request.

Example 82 includes the subject matter of any of Examples 73-81, and further comprising means for reflowing data from the remote resources of the remote computing node to local resources of the computing node in response to removing the mapping.

Example 83 includes the subject matter of any of Examples 73-82, and wherein the additional resources comprises memory resources, the remote resources comprises memory resources of the remote computing node, and the local address space comprises a memory address space of the computing node.

Example 84 includes the subject matter of any of Examples 73-83, and wherein the additional resources comprises storage resources, the remote resources comprises storage resources of the remote computing node, and the local address space comprises a storage address space of the computing node.

Example 85 includes a computing node for allowing remote resource usage, the computing node comprising: means for determining local resource availability to lend to remote computing nodes; means for advertising the local resource availability to remote computing nodes over a network fabric in response to determining the local resource availability; circuitry for receiving a resource request to borrow a local resource from a remote computing node in response to advertising the local resource availability; means for determining whether the local resource is available in response to receiving the resource request; and means for configuring a mapping of a local address space that includes the local resource to indicate the local resource is remotely owned in response to determining that the local resource is available.

Example 86 includes the subject matter of Example 85, and further comprising means for sending a hot-unplug notification to an operating system of the computing node in response to configuring the mapping.

Example 87 includes the subject matter of any of Examples 85 and 86, and further comprising: means for determining whether to reclaim the local resource in response to configuring the mapping; circuitry for sending a release request to the remote computing node in response to determining to reclaim the local resource, and means for configuring the mapping of the local address space to indicate that the local resource is locally owned in response to determining to reclaim the local resource.

Example 88 includes the subject matter of any of Examples 85-87, and further comprising means for performing a resource access operation to the local resource with the remote computing node over the network fabric in response to configuring the mapping.

Example 89 includes the subject matter of any of Examples 85-88, and wherein the means for performing the resource access operation comprises means for performing the resource access operation by a host fabric interface of the computing node.

Example 90 includes the subject matter of any of Examples 85-89, and wherein the means for determining the local resource availability comprises means for determining the local resource availability with a machine learning algorithm.

Example 91 includes the subject matter of any of Examples 85-90, and wherein the machine learning algorithm is based on one or more of an application need, a service level objective, a data center policy, a dynamic condition, or a resource demand history.

Example 92 includes the subject matter of any of Examples 85-91, and further comprising: circuitry for sending an acknowledgement to the remote computing node in response to determining that the local resource is available; wherein the means for configuring the mapping comprises means for configuring the mapping in response to sending the acknowledgment.

Example 93 includes the subject matter of any of Examples 85-92, and further comprising circuitry for sending a partial acknowledgement to the remote computing node in response to determining that the local resource is not available, wherein the partial acknowledgment is indicative of less than all of the local resource.

Example 94 includes the subject matter of any of Examples 85-93, and wherein the local resource comprises a memory resource of the computing node, and the local address space comprises a memory address space of the computing node.

Example 95 includes the subject matter of any of Examples 85-94, and wherein the local resource comprises a storage resource of the computing node, and the local address space comprises a storage address space of the computing node.

The invention claimed is:

1. A server system for use in network communication with at least one remote computer node via at least one network, the server system comprising:
  network communication circuitry for use in the network communication with the at least one remote computer network via the at least one network; and
  processing circuitry to execute instructions, the instructions, when executed by the processing circuitry, resulting in the server system being configurable to perform operations comprising:
    receiving one or more requests from the at least one remote computer node via the at least one network;
    based upon machine learning and the one or more requests, dynamically assigning one or more resources for use in service request processing associated with the at least one remote computer node;
    accessing the one or more resources for use in the service request processing; and
    providing to the at least one remote computer node, via the at least one network, data resulting from processing of the one or more requests;
  wherein:
    the one or more resources are accessible in accordance with mapping data for use in identifying the one or more resources in association with the service request processing;
    the machine learning is configurable to be based upon one or more of:
      resource usage monitoring data;
      resource demand history data;
      dynamic condition data; and/or
      application requirement data;
    the one or more resources are associated with the server system; and
    the one or more resources are configurable to comprise one or more of:
      one or more computing resources;
      one or more memory resources; and/or
      one or more storage resources.

2. The server system of claim 1, wherein:
the server system comprises a distributed computing system.

3. The server system of claim 2, wherein:
the operations further comprise:
  after the dynamically assigning of the one or more resources:
    releasing, based upon the machine learning, assignment of the one or more resources.

4. The server system of claim 3, wherein:
after the dynamically assigning of the one or more resources:
  the mapping data is to be reconfigured to reflect the releasing of the assignment of the one or more resources.

5. The server system of claim 4, wherein:
the server system also comprises graphical processing unit (GPU) circuitry and/or accelerator circuitry; and
the mapping data comprises address mapping data.

6. The server system of claim 4, wherein:
the one or more resources comprises a plurality of resources that are comprised in multiple computer nodes; and
the machine learning is configurable to be based upon service level data.

7. The server system of claim 4, wherein:
the machine learning is configurable to be based upon policy data.

8. At least one non-transitory machine-readable storage medium storing instructions for being executed by processing circuitry of a server system, the server system to be used in network communication with at least one remote computer node via at least one network, the instructions, when executed by the processing circuitry resulting in the server system being configured for performance of operations comprising:
  receiving one or more requests from the at least one remote computer node via the at least one network;
  based upon machine learning and the one or more requests, dynamically assigning one or more resources for use in service request processing associated with the at least one remote computer node;
  accessing the one or more resources for use in the service request processing; and
  providing to the at least one remote computer node, via the at least one network, data resulting from processing of the one or more requests;
wherein:
  the one or more resources are accessible in accordance with mapping data for use in identifying the one or more resources in association with the service request processing;
  the machine learning is configurable to be based upon one or more of:
    resource usage monitoring data;
    resource demand history data;
    dynamic condition data; and/or
    application requirement data;
  the one or more resources are associated with the server system; and the one or more resources are configurable to comprise
one or more of:
one or more computing resources;
one or more memory resources; and/or
one or more storage resources.

9. The at least one non-transitory machine-readable storage medium of claim 8, wherein:
the server system comprises a distributed computing system.

10. The at least one non-transitory machine-readable storage medium of claim 9, wherein:
the operations further comprise:
after the dynamically assigning of the one or more resources:
releasing, based upon the machine learning, assignment of the one or more resources.

11. The at least one non-transitory machine-readable storage medium of claim 10, wherein:
after the dynamically assigning of the one or more resources:
the mapping data is to be reconfigured to reflect the releasing of the assignment of the one or more resources.

12. The at least one non-transitory machine-readable storage medium of claim 11, wherein:
the server system also comprises graphical processing unit (GPU) circuitry and/or accelerator circuitry; and
the mapping data comprises address mapping data.

13. The at least one non-transitory machine-readable storage medium of claim 11, wherein:
the one or more resources comprises a plurality of resources that are comprised in multiple computer nodes; and
the machine learning is configurable to be based upon service level data.

14. The at least one non-transitory machine-readable storage medium of claim 11, wherein:
the machine learning is configurable to be based upon policy data.

15. A method implemented using a server system, the server system to be used in network communication with at least one remote computer node via at least one network, the method comprising:
receiving one or more requests from the at least one remote computer node via the at least one network;
based upon machine learning and the one or more requests, dynamically assigning one or more resources for use in service request processing associated with the at least one remote computer node;
accessing the one or more resources for use in the service request processing; and
providing to the at least one remote computer node, via the at least one network, data resulting from processing of the one or more requests;
wherein:
the one or more resources are accessible in accordance with mapping data for use in identifying the one or more resources in association with the service request processing;
the machine learning is configurable to be based upon one or more of:
resource usage monitoring data;
resource demand history data;
dynamic condition data; and/or
application requirement data;
the one or more resources are associated with the server system; and
the one or more resources are configurable to comprise one or more of:
one or more computing resources;
one or more memory resources; and/or
one or more storage resources.

16. The method of claim 15, wherein:
the server system comprises a distributed computing system.

17. The method of claim 16, wherein:
the method further comprises:
after the dynamically assigning of the one or more resources:
releasing, based upon the machine learning, assignment of the one or more resources.

18. The method of claim 17, wherein:
after the dynamically assigning of the one or more resources:
the mapping data is to be reconfigured to reflect the releasing of the assignment of the one or more resources.

19. The method of claim 18, wherein:
the server system also comprises graphical processing unit (GPU) circuitry and/or accelerator circuitry; and
the mapping data comprises address mapping data.

20. The method of claim 18, wherein:
the one or more resources comprises a plurality of resources that are comprised in multiple computer nodes; and
the machine learning is configurable to be based upon service level data.

21. The method of claim 18, wherein:
the machine learning is configurable to be based upon policy data.

\* \* \* \* \*